US010444795B2

(12) United States Patent
Cao et al.

(10) Patent No.: US 10,444,795 B2
(45) Date of Patent: Oct. 15, 2019

(54) GLASS COVER PLATE FOR A DISPLAY ASSEMBLY, DISPLAY ASSEMBLY, AND TERMINAL

(71) Applicant: WUHAN CHINA STAR OPTOELECTRONICS SEMICONDUCTOR DISPLAY TECHNOLOGY CO., LTD., Wuhan, Hubei (CN)

(72) Inventors: Haoran Cao, Hubei (CN); Pil geun Chun, Hubei (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 15/781,128

(22) PCT Filed: Apr. 28, 2018

(86) PCT No.: PCT/CN2018/085161
§ 371 (c)(1),
(2) Date: Jun. 3, 2018

(65) Prior Publication Data
US 2019/0286192 A1 Sep. 19, 2019

(30) Foreign Application Priority Data
Mar. 16, 2018 (CN) .......................... 2018 1 0218154

(51) Int. Cl.
*G06F 1/16* (2006.01)
*G09F 9/30* (2006.01)

(52) U.S. Cl.
CPC .............. *G06F 1/1637* (2013.01); *G09F 9/30* (2013.01)

(58) Field of Classification Search
CPC .... G06F 1/1637; H04R 1/023; H04M 1/0266; H04M 1/0283; H04M 1/035
See application file for complete search history.

(56) References Cited

U.S. PATENT DOCUMENTS

| 4,225,970 A * | 9/1980 | Jaramillo | H04B 1/3833 455/345 |
| 7,778,015 B2 * | 8/2010 | Weber | C25D 11/16 340/815.53 |

(Continued)

FOREIGN PATENT DOCUMENTS

| CN | 106506742 A | 3/2017 |
| CN | 107613060 A | 1/2018 |

(Continued)

*Primary Examiner* — Adrian S Wilson
(74) *Attorney, Agent, or Firm* — Mark M Friedman (57) ABSTRACT

A glass cover plate for a display assembly, a display assembly and a terminal are provided. The glass cover plate includes a displaying region and a periphery region. The displaying region corresponds to a displaying area of the display assembly. A periphery region of the display panel surrounds the displaying region. A first corner portion of the periphery region includes a first information medium window. The first information medium window corresponds to a first electrical element. The present invention makes the display assembly have a higher screen-to-body ratio and prevents notches formed in the display assembly.

13 Claims, 9 Drawing Sheets

(56) References Cited

U.S. PATENT DOCUMENTS

| | | | | |
|---|---|---|---|---|
| 2004/0204125 A1* | 10/2004 | Messel | | H04M 1/22 455/566 |
| 2006/0238446 A1* | 10/2006 | Takahashi | | G06F 1/1601 345/55 |
| 2008/0002093 A1* | 1/2008 | Kim | | G02B 6/0086 349/58 |
| 2008/0024470 A1* | 1/2008 | Andre | | G09F 9/30 345/204 |
| 2009/0122475 A1* | 5/2009 | Kim | | G02F 1/133308 361/679.21 |
| 2009/0185339 A1 | 7/2009 | Kwon et al. | | |
| 2009/0257207 A1* | 10/2009 | Wang | | G06F 1/1626 361/752 |
| 2009/0296325 A1* | 12/2009 | Morimoto | | H04M 1/185 361/679.01 |
| 2010/0061040 A1* | 3/2010 | Dabov | | G06F 1/1626 361/679.01 |
| 2010/0061044 A1* | 3/2010 | Zou | | B32B 3/02 361/679.01 |
| 2010/0110201 A1* | 5/2010 | Yukawa | | G06F 1/1615 348/207.1 |
| 2011/0050054 A1* | 3/2011 | Chang | | H04M 1/0266 312/223.1 |
| 2011/0096477 A1* | 4/2011 | Wang | | H04M 1/0266 361/679.01 |
| 2011/0165916 A1* | 7/2011 | Park | | H01Q 1/06 455/566 |
| 2011/0255218 A1* | 10/2011 | Pakula | | G06F 1/1626 361/679.01 |
| 2012/0243719 A1* | 9/2012 | Franklin | | G06F 1/1652 381/333 |
| 2012/0268881 A1* | 10/2012 | Bergeron | | B29C 63/02 361/679.26 |
| 2012/0299841 A1* | 11/2012 | Tang | | H01Q 1/1271 345/173 |
| 2013/0162124 A1* | 6/2013 | Miyaoka | | H05K 5/0217 312/223.1 |
| 2013/0165189 A1* | 6/2013 | Shoji | | G06F 1/16 455/575.1 |
| 2013/0182379 A1* | 7/2013 | Kim | | H04M 1/0283 361/679.01 |
| 2013/0223667 A1* | 8/2013 | Kim | | H04R 1/2842 381/333 |
| 2014/0376165 A1* | 12/2014 | Han | | H04M 1/0266 361/679.01 |
| 2015/0036285 A1* | 2/2015 | Lu | | G06F 1/1656 361/679.46 |
| 2015/0036286 A1* | 2/2015 | Lu | | G06F 1/1626 361/679.46 |
| 2015/0146905 A1* | 5/2015 | Abe | | H04R 1/086 381/334 |
| 2019/0043414 A1 | 2/2019 | Wu | | |

FOREIGN PATENT DOCUMENTS

| | | |
|---|---|---|
| CN | 107643638 A | 1/2018 |
| CN | 107690251 A | 2/2018 |

\* cited by examiner

GLASS COVER PLATE FOR A DISPLAY ASSEMBLY, DISPLAY ASSEMBLY, AND TERMINAL

FIELD OF INVENTION

The present invention relates to displaying technology fields, especially to a glass cover plate for use in a display assembly, a display assembly, and a terminal.

BACKGROUND OF INVENTION

Screen-to-body ratio of conventional terminals is increasing, and frames thereof have become narrower. Therefore, space outside a display panel of the conventional terminals for disposing electronic devices (for example, front cameras) is decreasing.

To make the terminal have a higher screen-to-body ratio, one current technical solution includes cutting (customizing) a middle of a top of the display panel such that the display panel has a notch and, a space corresponding to the notch, is for accommodating electronic devices, such as a front camera.

In the above technical solution, because the cut display panel has the notch, the notch significantly increases manufacturing cost of the display panel, lowers yield rate of the display panel and probably affects lifespan of the products.

Thus, it is necessary to submit a new technical solution to solve the above issues.

SUMMARY OF INVENTION

An objective of the present invention is to provide a glass cover plate for use in a display assembly, a display assembly thereof and a terminal thereof that are able to make the display assembly have a higher screen-to-body ratio.

To solve the above issue, a technical solution of the present invention is as follows.

A glass cover plate for use in a display assembly includes: a displaying region, the displaying region corresponding to a displaying area of a display panel of the display assembly; and a periphery region, the periphery region surrounding the displaying region; wherein a first corner portion of the periphery region has a first information medium window, the first information medium window corresponds to a first electrical element; wherein a masking layer is disposed on the periphery region, a first through hole is disposed in the masking layer and located over the first information medium window, and the masking layer is an ink layer; wherein the display assembly further includes a polarizer and a structural reinforcement plate, the polarizer is disposed between the glass cover plate and the display panel, the polarizer is configured to increase visibility of images shown by the display panel when the display panel is irradiated by bright environmental light, the display panel is disposed on the structural reinforcement plate, the structural reinforcement plate is disposed on a terminal main body, and the structural reinforcement plate is configured to enhance a structural strength of the display assembly.

In the above glass cover plate for use in the display assembly, the periphery region further includes a second corner portion, the second corner portion and the first corner portion are located on a same side of the periphery region.

A glass cover plate for use in a display assembly includes: a displaying region, the displaying region corresponding a displaying area of a display panel of the display assembly; a periphery region, the periphery region surrounding the displaying region; wherein a first corner portion of the periphery region has a first information medium window, the first information medium window corresponds to first electrical element.

In the above glass cover plate for use in the display assembly, the periphery region further includes a second corner portion, the second corner portion and the first corner portion are located on a same side of the periphery region.

In the above glass cover plate for use in the display assembly, the second corner portion includes a second information medium window, the second information medium window corresponds to a second electrical element.

In the above glass cover plate for use in the display assembly, the periphery region further includes a third corner portion, the third corner portion and the first corner portion are disposed oppositely.

In the above glass cover plate for use in the display assembly, the third corner portion includes a third information medium window, the third information medium window corresponds to a third electrical element.

In the above glass cover plate for use in the display assembly, the periphery region further includes a fourth corner portion, the fourth corner portion and the third corner portion are located on a same side of the periphery region, and the fourth corner portion and the second corner portion are disposed oppositely.

In the above glass cover plate for use in the display assembly, the fourth corner portion includes a fourth information medium window, the fourth information medium window corresponds to a fourth electrical element.

In the above glass cover plate for use in the display assembly, a masking layer is disposed on the periphery region, a first through hole is disposed in the masking layer and located over the first information medium window, a second through hole is disposed in the masking layer and located over the second information medium window, a third through hole is disposed in the masking layer and located over the third information medium window, and a fourth through hole is disposed in the masking layer and located over the fourth information medium window.

In the above glass cover plate for use in the display assembly, the periphery region further includes a fifth information medium window, the fifth information medium window is located between the first corner portion and the second corner portion, the fifth information medium window penetrates the glass cover plate along a direction that is perpendicular to a plane paralleling the glass cover plate, and the fifth information medium window corresponds to a fifth electrical element.

In the above glass cover plate for use in the display assembly, the first information medium window, the second information medium window, the third information medium window, the fourth information medium window, the fifth information medium window are configured respectively for information mediums each of which is transmitted between a space outside a second surface of the glass cover plate and one of the first electrical element, the second electrical element, the third electrical element, the fourth electrical element and the fifth electrical element.

In the above glass cover plate for use in the display assembly, an orthographic projection of an outline of the periphery region on a plane paralleling the glass cover plate is rectangular, an orthographic projection of an outline of the displaying region on the plane paralleling the glass cover plate is rectangular, circular or elliptical, and the first corner portion, the second corner portion, the third corner portion and the fourth corner portion correspond to four corners of the periphery region.

In the above glass cover plate for use in the display assembly, an orthographic projection of an edge portion of the displaying region on a plane paralleling the glass cover plate includes two opposite first straight edge portions, two opposite second straight edge portions and four first curved edge portions, wherein two ends of each of the first curved edge portions are connected to a corresponding first straight edge portion and a corresponding second straight edge portion corresponding to the first straight edge portion, respectively; and the four first curved edge portions correspond to the first corner portion, the second corner portion, the third corner portion and the fourth corner portion; and the four first curved edge portions are all located within a closed pattern enclosed by extension lines of the two first straight edge portions and the two second straight edge portions.

In the above glass cover plate for use in the display assembly, a portion of the displaying region corresponding to each first straight edge portion, according to a first bending line serving as an axis line, bends or curves perpendicularly relative to a plane corresponding to the glass cover plate; and a portion of the displaying region corresponding to each second straight edge portion, according to a second bending line serving as an axis line, bends or curves perpendicularly relative to the plane corresponding to the glass cover plate; wherein an intersecting point of an extension line of the first bending line and an extension line of the second bending line is located outside the displaying region.

In the above glass cover plate for use in the display assembly, a curvature radius of one of the four first curved edge portions is greater or less than a curvature radius of another; or a curvature radius of one of the four first curved edge portions is equal to a curvature radius of another.

In the above glass cover plate for use in the display assembly, an orthographic projection of an edge portion of the periphery region on the plane paralleling the glass cover plate includes two opposite third straight edge portions, two opposite fourth straight edge portions and four second curved edge portions, wherein each of the second curved edge portions is connected to a corresponding third straight edge portion and a corresponding fourth straight edge portion, and the four second curved edge portions correspond to the first corner portion, the second corner portion, the third corner portion and the fourth corner portion; wherein the four second curved edge portions are all located within a closed pattern enclosed by extension lines of the two third straight edge portions and the two fourth straight edge portions, and a curvature radius of first curve corresponding to the first curved edge portion is greater than a curvature radius of a second curve corresponding to the second curved edge portion.

In the above glass cover plate for use in the display assembly, an orthographic projection of an edge portion of the periphery region on a plane paralleling the glass cover plate includes two opposite third straight edge portions, two opposite fourth straight edge portions and four second curved edge portions, wherein third straight lines corresponding to the third straight edge portions are perpendicular to fourth straight lines corresponding to the fourth straight edge portions, each of the second curved edge portions is connected to a corresponding third straight edge portion and a corresponding fourth straight edge portion, the four second curved edge portions correspond to the first corner portion, the second corner portion, the third corner portion and the fourth corner portion; wherein the four second curved edge portions are all located out of a closed pattern enclosed by extension lines of the two third straight edge portions and the two fourth straight edge portions.

A display assembly including the glass cover plate further includes a display panel, and the display panel is installed on the glass cover plate.

A terminal including the glass cover plate further includes a display panel and a terminal main body, and the display panel and the glass cover plate are installed on the terminal main body.

In comparison to the prior art, because the present invention disposes the first information medium window on the portion of the periphery region corresponding to the first curved edge portion and disposes the first electrical element on the portion corresponding to the first information medium window, cutting a notch on the top of the middle region of the glass cover plate for accommodating the first electrical element is unnecessary, which helps to avoid increased manufacturing costs of the glass cover plate and/or display assembly, and avoid lowered yield rate and service life of the display assembly probably affecting the lifespan of the product. In other words, the present invention makes the terminal have a higher screen-to-body ratio.

To make the above contents of the present invention more clearly understandable, preferred embodiments accompanied by drawings will be described in details as follows.

DETAILED DESCRIPTION OF PREFERRED EMBODIMENTS

The word "embodiment" used in this specification means an instance, a case, or an example. In addition, the articles "a" and "an" used in this specification and the appended claims may be generally construed as "one or more" unless specified otherwise or it is clear to determine the singular form from the context.

It is understood that the descriptions related to "first", "second", and the like in the present invention are for descriptive purposes only, and cannot be interpreted as explicit or implicit indication of relative importance or indirect indication of the number of technical features. Thus, a feature that defines "first", "second" may explicitly indicate that, or implicitly includes at least one of the features. In addition, the technical solutions of the embodiments may be combined with one another on the basis that a person of ordinary skill in the art is able to realize the combined technical solutions. When the combination of technical solutions is contradictory or unachievable, it should be considered that the combination of such technical solutions does not exist, nor is it within the scope of protection required by the present invention.

Terminals for realizing the inventions of the present invention will now be described with reference to the accompanying drawings. In the following description, the use of suffixes such as "module", "part", or "unit" for representing an element is merely an illustration for the benefit of the present invention. The suffix itself does not have a specific meaning. Therefore, "module" and "part" can be used hybridly.

For example, the terminal described in the present invention may include terminals with telecommunication functions such as a mobile phone, a smart phone, a notebook, a digital radio broadcast receiver, a personal digital assistant (PDA), a tablet, a portable medium player, a navigation device, and the like. Next, it is assumed that terminal is a mobile terminal. However, those skilled in the art will understand that the construction according to the embodiments of the present invention can also be applied to fixed type terminals except for an element specially used for a mobile purpose.

Figure 1:
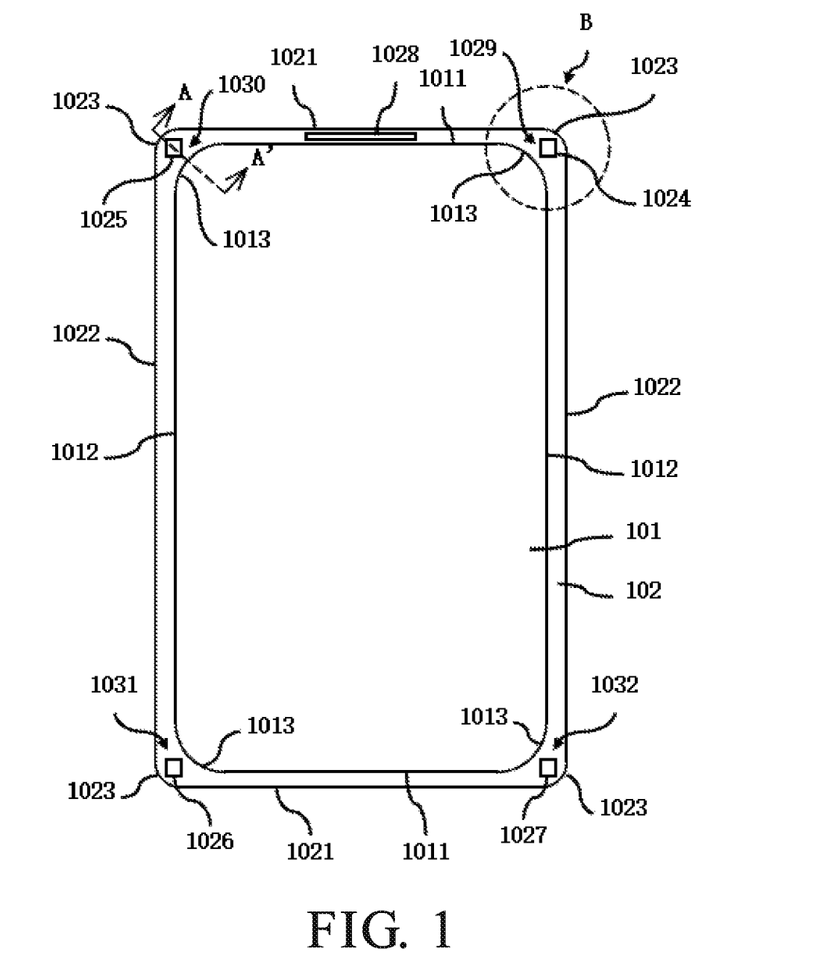
FIG. 1 is a schematic view of a first embodiment of a glass cover plate of the present invention.
Figure 2:
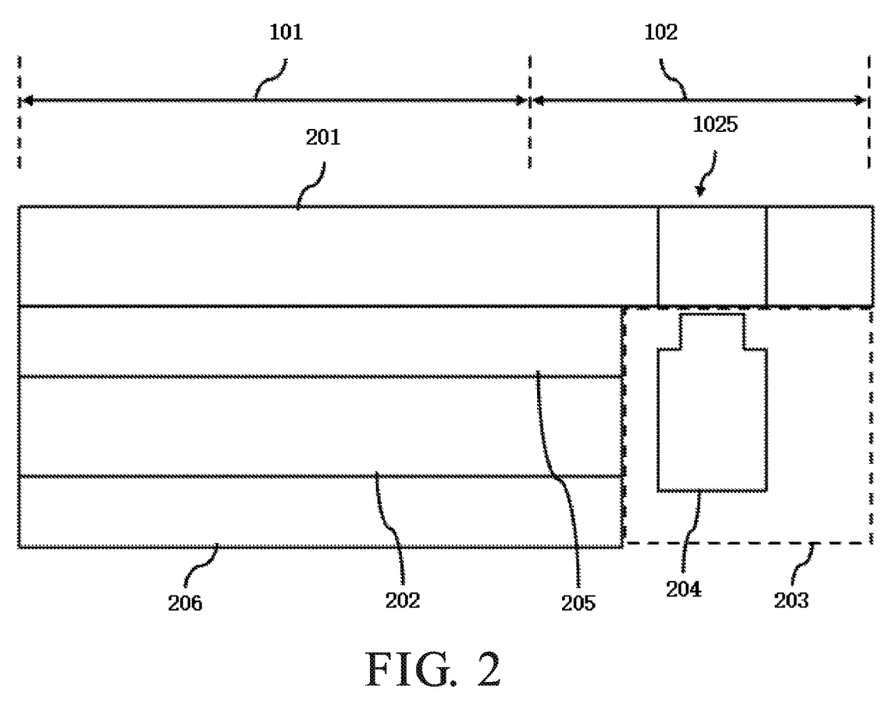
FIG. 2 is a schematic cross-sectional view of a display panel combined with the glass cover plate in FIG. 1 along line A-A' in FIG. 1.
Figure 3:
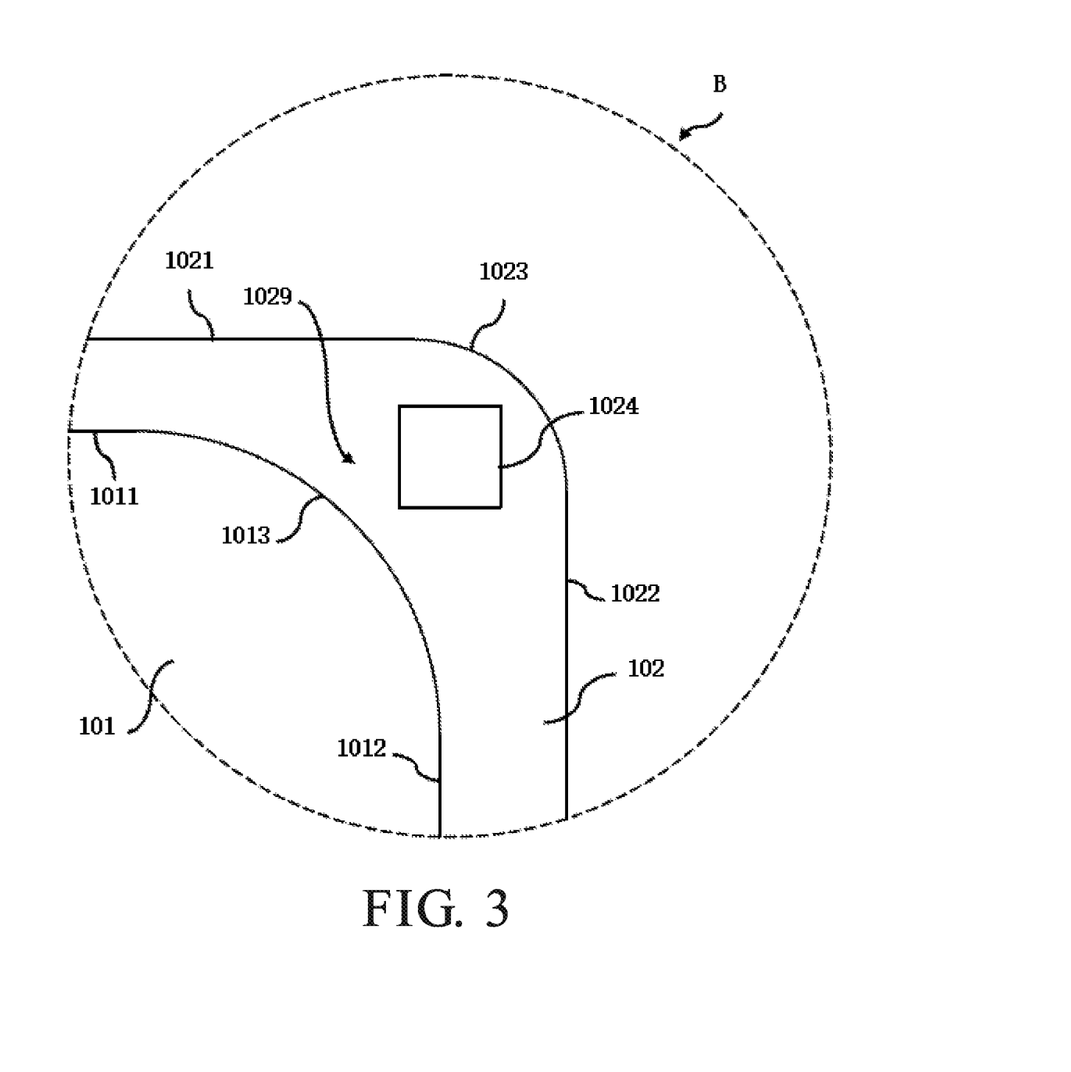
FIG. 3 is a schematic view of an area B of the glass cover plate in FIG. 1.

With reference to FIGS. 1 to 3, FIG. 1 is a schematic view of a first embodiment of a glass cover plate 201 of the present invention. FIG. 2 is a schematic cross-sectional view of a display panel 202 combined with the glass cover plate 201 in FIG. 1 along line A-A' in FIG. 1. FIG. 3 is a schematic view of an area B of the glass cover plate 201 in FIG. 1.

The terminal of the present invention includes a display assembly and a terminal main body (not shown in figures). The display assembly includes a display panel 202 and a glass cover plate 201 (the glass cover plate 201 for the display assembly). The display panel 202 is installed in the glass cover plate 201. The display panel 202 and the glass cover plate 201 are installed in an installation chamber of the terminal main body such that the display panel 202 is located between the glass cover plate 201 and the terminal main body. In the first embodiment, the terminal main body may be a substantially longitudinal cuboid. A top of the terminal main body is disposed with the installation chamber. The display panel 202 may be a liquid crystal display (LCD) screen, an organic light-emitting display (OLED) screen or a Micro LED screen. Of course, a shape of the terminal main body, a disposing position of the installation chamber and the types of the display panel 202 are not limited thereby.

The glass cover plate 201 of the present invention includes a displaying region 101 and a periphery region 102. The displaying region 101 corresponds to a displaying area (Active Area, AA) of the display panel 202 of the display assembly, the periphery region 102 surrounds the displaying region 101.

The periphery region 102 includes a first corner portion 1029. The first corner portion 1029 of the periphery region 102 includes a first information medium window 1024. The first information medium window 1024 corresponds to a first electrical element.

Figure 4:
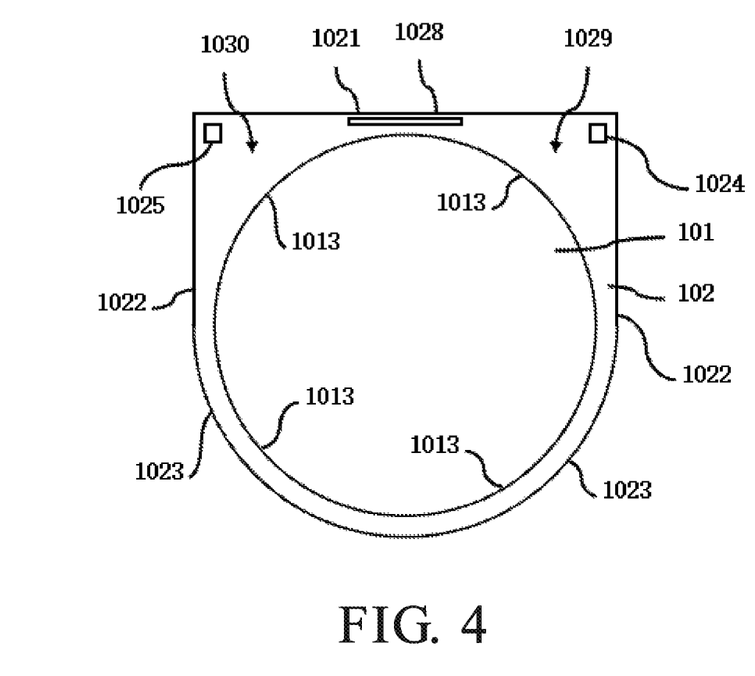
FIG. 4 is a schematic view of a second embodiment of the glass cover plate of the present invention.

Alternatively, the periphery region 102 includes the first corner portion 1029 and a second corner portion 1030, as shown in FIG. 4. The second corner portion 1030 and the first corner portion 1029 are located on a same side of the periphery region 102. The second corner portion 1030 includes a second information medium window 1025. The second information medium window 1025 corresponds to a second electrical element 204.

Alternatively, the periphery region 102 includes the first corner portion 1029, the second corner portion 1030 and a third corner portion 1031. The third corner portion 1031 and the first corner portion 1029 are disposed oppositely. The third corner portion 1031 has a third information medium window 1026. The third information medium window 1026 corresponds to a third electrical element.

Alternatively, the periphery region 102 includes the first corner portion 1029, the second corner portion 1030, a third corner portion 1031 and a fourth corner portion 1032, as shown in FIG. 1. The fourth corner portion 1032 and the third corner portion 1031 are located on a same side of the periphery region 102. The fourth corner portion 1032 and the second corner portion 1030 are disposed oppositely. The fourth corner portion 1032 includes a fourth information medium window 1027. The fourth information medium window 1027 corresponds to a fourth electrical element.

The periphery region 102 further includes a fifth information medium window 1028, as shown in FIG. 1, the fifth information medium window 1028 is located between the first corner portion 1029 and the second corner portion 1030. The fifth information medium window 1028 penetrates the glass cover plate 201 along a direction that is perpendicular to a plane paralleling the glass cover plate, and the fifth information medium window 1028 corresponds to a fifth electrical element The first electrical element, the second electrical element 204, the third electrical element, the fourth electrical element and the fifth electrical element are all disposed in the terminal main body.

At least one of the first electrical element, the second electrical element 204, the third electrical element, the fourth electrical element and the fifth electrical element includes a sensor (for example, camera, infrared sensor), a light (for example, information light), etc. The fifth electrical element may be a speaker (earpiece).

The first information medium window 1024, the second information medium window 1025, the third information medium window 1026, the fourth information medium window 1027 and the fifth information medium window 1028 are respectively configured for information mediums each of which is transmitted between a space outside a second surface of the glass cover plate 201 and one of the first electrical element, the second electrical element 204, the third electrical element, the fourth electrical element and the fifth electrical element.

The information medium at least includes light (visible light and invisible light). Furthermore, the information medium may also include sound. Optionally, the first information medium window 1024, the second information medium window 1025, the third information medium window 1026, the fourth information medium window 1027, the fifth information medium window 1028 may penetrate the glass cover plate 201 to allow information mediums such as sound and light to pass, and may be transparent to allow information medium, such as light, to pass.

An orthographic projection of an outline of the periphery region 102, on a plane paralleling the glass cover plate 201, is rectangular; an orthographic projection of an outline of the displaying region 101 on the plane paralleling the glass cover plate 201 is rectangular, circular or elliptical, and the first corner portion 1029, the second corner portion 1030, the third corner portion 1031 and the fourth corner portion 1032 correspond to four corners of the periphery region 102. The plane paralleling the glass cover plate 201 refers to the plane paralleling a main body portion of the glass cover plate 201. For example, when the glass cover plate 201 is placed horizontally, the plane refers to a horizontal plane.

Figure 5:
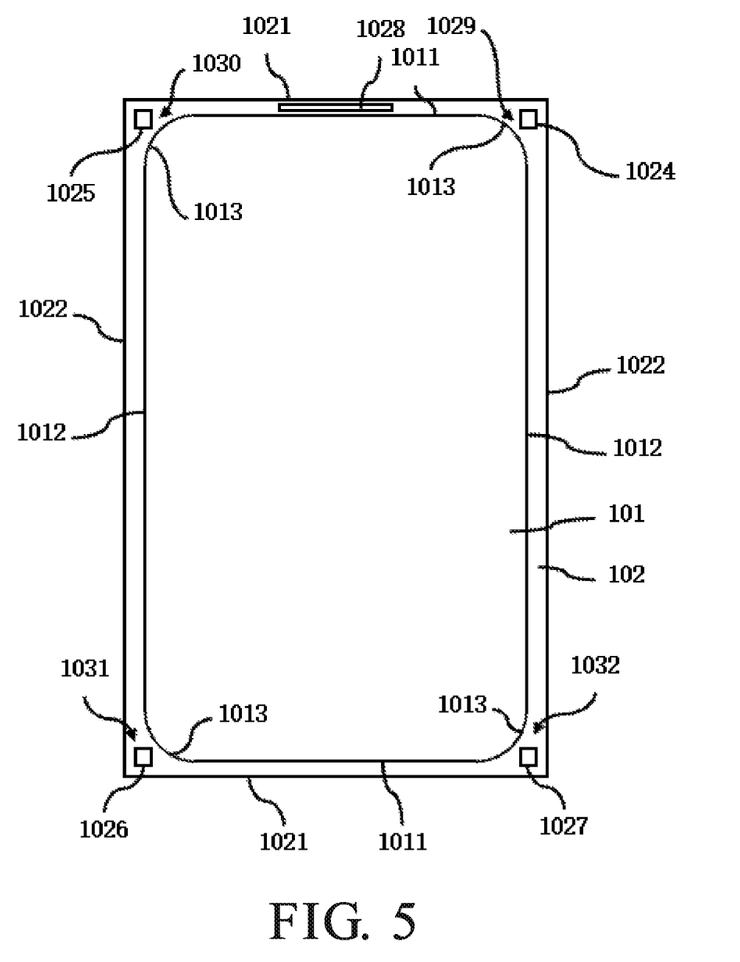
FIG. 5 is a schematic view of a third embodiment of the glass cover plate of the present invention.

The terminology "rectangular" here refers to regularly rectangular (as shown in FIG. 5) or substantially rectangular (for example: substantially rectangular shape has four straight sides, and at least one of four corners of the shape is round or beveled. When viewed as a whole, the shape is substantially regularly rectangular, as shown in FIG. 1, FIG. 4).

The terminology "circular" here refers to regularly circular or substantially circular (for example: substantially circular shape is certainly twisted or defective. When viewed as a whole, the shape is substantially regularly circular).

The terminology "elliptical" here refers to regularly elliptical or substantially elliptical (for example: substantially elliptical shape is certainly twisted or defective. When viewed as a whole, the shape is substantially regularly elliptical).

A masking layer is disposed on the periphery region 102. A first through hole is disposed in the masking layer and located over the first information medium window 102. A second through hole is disposed in the masking layer and located over the second information medium window 1025. A third through hole is disposed in the masking layer and located over the third information medium window 1026. A fourth through hole is disposed in the masking layer and located over the fourth information medium window 1027. Optionally, the masking layer is an ink layer, and the ink layer may be white or black.

Each portion in the display assembly corresponding to the first corner portion 1029, the second corner portion 1030, the third corner portion 1031 and the fourth corner portion 1032 includes a first accommodating space, a second accommodating space 203, a third accommodating space or a fourth accommodating space. The display assembly further includes a fifth accommodating space, the fifth accommodating space located between the first accommodating space and the second accommodating space 203.

The glass cover plate 201 covers the first accommodating space, the second accommodating space 203, the third accommodating space, the fourth accommodating space, and the fifth accommodating space. The first surface faces the first accommodating space, the second accommodating space 203, the third accommodating space, the fourth accommodating space, and the fifth accommodating space. Positions of the first accommodating space, the second accommodating space 203, the third accommodating space, the fourth accommodating space and the fifth accommodating space correspond to positions of the first information medium window 1024, the second information medium window 1025, the third information medium window 1026, the fourth information medium window 1027 and the fifth information medium window 1028 in the glass cover plate 201. The first accommodating space, the second accommodating space 203, the third accommodating space, the fourth accommodating space and the fifth accommodating space are configured respectively to accommodate the first electrical element, the second electrical element 204, the third electrical element, the fourth electrical element and the fifth electrical element.

The first surface and the second surface are two oppositely disposed surfaces of the glass cover plate 201.

The display assembly further includes a polarizer 205. The polarizer 205 is disposed between the glass cover plate 201 and the display panel 202. The polarizer 205 is configured to increase visibility of images shown by the display panel 202 when the display panel 202 is irradiated by bright environmental light.

The display assembly further includes a structural reinforcement plate 206. The display panel 202 is disposed on the structural reinforcement plate 206, the structural reinforcement plate 206 is disposed on the terminal main body. The structural reinforcement plate 206 is configured to enhance a structural strength of the display assembly.

Material of the structural reinforcement plate 206 is Polyethylene Terephthalate (PET).

The display assembly further includes a fixing member, the fixing member is disposed in at least one of the first accommodating space, the second accommodating space 203, the third accommodating space, the fourth accommodating space and the fifth accommodating space. The fixing member is configured to fix at least one of the first electrical element, the second electrical element 204, the third electrical element, the fourth electrical element and the fifth electrical element.

Furthermore, the fixing member is composed of a first engaging hole of an edge portion of the polarizer 205 and/or a second engaging hole of an edge portion of the structural reinforcement plate 206. A resilient engaging pad is disposed on an inner side/inner wall of the first engaging hole and/or the second engaging hole. Material of the resilient engaging pad is rubber.

Furthermore, the first electrical element, the second electrical element 204, the third electrical element, the fourth electrical element, the fifth electrical element presses respectively against the first information medium window 1024, the second information medium window 1025, the third information medium window 1026, the fourth information medium window 1027 and the fifth information medium window 1028.

Furthermore, engaging portions are disposed on places of a first surface of the glass cover plate 201 corresponding to the first information medium window 1024, the second information medium window 1025, the third information medium window 1026, the fourth information medium window 1027 and the fifth information medium window 1028. At least one portion of each of the first electrical element, the second electrical element 204, the third electrical element, the fourth electrical element and the fifth electrical element is disposed in one of the engaging portions. The engaging portions are configured to engage with the first electrical element, the second electrical element 204, the third electrical element, the fourth electrical element and the fifth electrical element such that the first electrical element, the second electrical element 204, the third electrical element, the fourth electrical element, the fifth electrical element are fixed securely relative to the first information medium window 1024, the second information medium window 1025, the third information medium window 1026, the fourth information medium window 1027 and the fifth information medium window 1028.

The first information medium window 1024, the second information medium window 1025, the third information medium window 1026 and the fourth information medium window 1027 are disposed as transparent or translucent.

An orthographic projection of an edge portion of the displaying region 101 on a plane paralleling the glass cover plate 201 includes two opposite first straight edge portions 1011, two opposite second straight edge portions 1012 and four first curved edge portions 1013. Two ends of each of the first curved edge portions 1013 are connected to a corresponding first straight edge portion 1011 and a corresponding second straight edge portion 1012 corresponding to the first straight edge portion 1011, respectively.

A first straight line corresponding to the first straight edge portion 1011 is perpendicular to a second straight line corresponding to the second straight edge portion 1012.

Each first straight edge portion 1011 or each second straight edge portion 1012 is located between two of the first curved edge portions 1013.

The four first curved edge portions 1013 correspond to the first corner portion 1029, the second corner portion 1030, the third corner portion 1031 and the fourth corner portion 1032. The four first curved edge portions 1013 are all located within a closed pattern enclosed by extension lines of the two first straight edge portions 1011 and the two second straight edge portions 1012.

The first information medium window 1024, the second information medium window 1025, the third information medium window 1026, the fourth information medium window 1027 are disposed in a portion of the periphery region 102 radially extending outward from the first curved edge portion 1013 along a direction away from the displaying region 101.

The first corner portion 1029, the second corner portion 1030, the third corner portion 1031 and the fourth corner portion 1032 are portions of the periphery region 102 radially extending outward from the first curved edge portion 1013 along a direction away from the displaying region 101.

A curvature radius of one of the four first curved edge portions 1013 is greater or less than a curvature radius of another; or a curvature radius of the four first curved edge portions 1013 is equal to a curvature radius of another.

An orthographic projection of an edge portion of the periphery region 102 on the plane paralleling the glass cover plate 201 includes two opposite third straight edge portions 1021, two opposite fourth straight edge portions 1022 and four second curved edge portions 1023. Each of the second curved edge portions 1023 is connected to a corresponding third straight edge portion 1021 and a corresponding fourth straight edge portion 1022.

A third straight line corresponding to the third straight edge portion 1021 is perpendicular to a fourth straight line corresponding to the fourth straight edge portion 1022.

The third straight edge portion 1021 or the fourth straight edge portion 1022 are located between two of the second curved edge portions 1023.

The four second curved edge portions 1023 correspond to the first corner portion 1029, the second corner portion 1030, the third corner portion 1031 and the fourth corner portion 1032. The four second curved edge portion 1023 are all located within a closed pattern enclosed by extension lines of the two third straight edge portions 1021 and the two fourth straight edge portions 1022.

The first curve, the second curve are regular curves or irregular curves. The regular curves include arc curves, parabolas. The irregular curves are curves other than regular curves.

Under the circumstance that the first curve and the second curve are all arc curves, a curvature radius of a first curve corresponding to the first curved edge portion 1013 is greater than a curvature radius of a second curve corresponding to the second curved edge portion 1023.

Under the circumstance that an interval between the first straight edge portion 1011 and the third straight edge portion 1021 is less than a first predetermined value and/or an interval between the second straight edge portion 1012 and the fourth straight edge portion 1022 is less than a second predetermined value, the first curved edge portion 1013 and the second curved edge portion 1023 with different curvature radiuses (the curvature radius of the first curve is greater than the curvature radius of the second curve) are configured to provide the first information medium window 1024, the second information medium window 1025, the third information medium window 1026, the fourth information medium window 1027 with a disposing space.

In the first embodiment, four corners of the outline of the periphery region 102 are all rounded.

In comparison to the prior art, because the present invention disposes the first information medium window 1024, the second information medium window 1025, the third information medium window 1026 and the fourth information medium window 1027 on the portions of the periphery region 102 corresponding to the first curved edge portions 1013, and disposes the first electrical element, the second electrical element 204, the third electrical element and the fourth electrical element on portions corresponding to the first information medium window 1024, the second information medium window 1025, the third information medium window 1026 and the fourth information medium window 1027, cutting notches on the top of the middle region of the glass cover plate 201 for accommodating the first electrical element, the second electrical element 204, the third electrical element and the fourth electrical element is unnecessary, which helps to avoid increased manufacturing costs of the glass cover plate 201 and/or display assembly, and avoid lowered yield rate and service life of the display assembly probably affecting the lifespan of the product. In other words, the present invention makes the terminal have a higher screen-to-body ratio and prevents notches formed in the display assembly.

With reference to FIG. 4, FIG. 4 is a schematic view of a second embodiment of the glass cover plate 201 of the present invention. The second embodiment and first embodiment are similar, and a difference is as follows:

In the second embodiment, the periphery region 102 only includes the first corner portion 1029 and the second corner portion 1030. The orthographic projection of the edge portion of the periphery region 102 on a plane paralleling the glass cover plate 201 includes a single third straight edge portion 1021, the two opposite fourth straight edge portions 1022 and the two second curved edge portions 1023. One end of each second curved edge portion 1023 is connected one of the fourth straight edge portions 1022, and the other end of the second curved edge portion 1023 is connected to another second curved edge portion 1023.

In the places of the first corner portion 1029 and the second corner portion 1030, one end of the third straight edge portion 1021 is connected to one end of one fourth straight edge portion 1022.

A shape of a side edge of the periphery region corresponding to the third straight edge portion 1021 is an arc composed of the two second curved edge portions 1023. The displaying region 101 is circular.

With reference to FIG. 5, FIG. 5 is a schematic view of a third embodiment of the glass cover plate 201 of the present invention. The third embodiment and the above first embodiment or second embodiment are similar, and a difference therebetween is as follows:

In the third embodiment, four corners of the outline of the periphery region 102 are all right angles. In other words, one end of one first straight edge portion 1011 is connected to one end of one second straight edge portion 1012.

Figure 6:
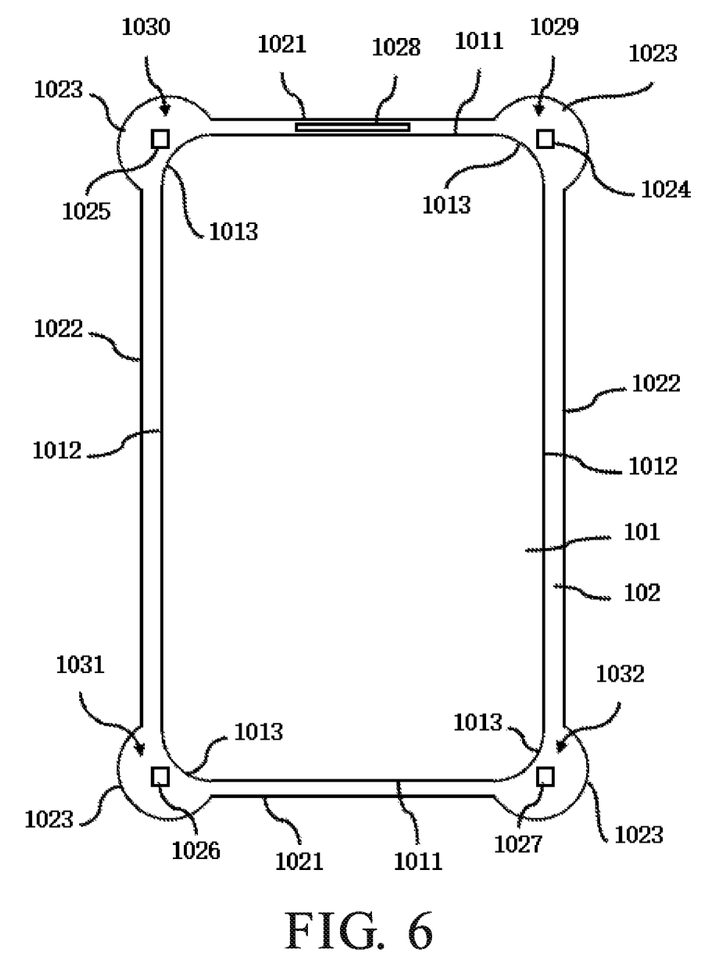
FIG. 6 is a schematic view of a fourth embodiment of the glass cover plate of the present invention.

FIG. 6 is a schematic view of a fourth embodiment of the glass cover plate 201 of the present invention. The fourth embodiment and any of the above first to third embodiments are similar, and a difference therebetween is as follows:

In the fourth embodiment, the orthographic projection of the edge portion of the periphery region 102 on the plane paralleling the glass cover plate 201 includes two opposite third straight edge portions 1021, two opposite fourth straight edge portions 1022 and four second curved edge portions 1023. Third straight lines corresponding to the third straight edge portions 1021 are perpendicular to fourth straight lines corresponding to the fourth straight edge portions 1022. Each of the second curved edge portions 1023 is connected to a corresponding third straight edge portion 1021 and a corresponding fourth straight edge portion 1022. The four second curved edge portion 1023 correspond to the first corner portion 1029, the second corner portion 1030, the third corner portion 1031 and the fourth corner portion 1032. The four second curved edge portions 1023 are all located out of a closed pattern enclosed by extension lines of the two third straight edge portions 1021 and the two fourth straight edge portions.

Figure 7:
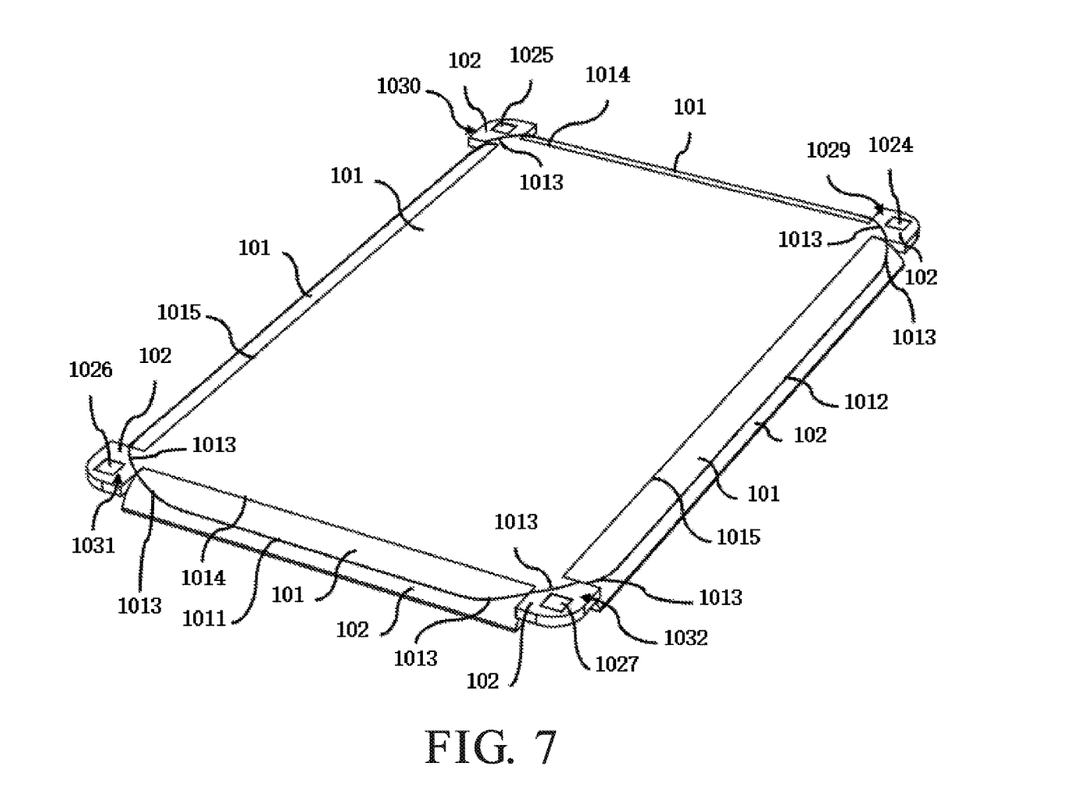
FIG. 7 is a perspective view of a fifth embodiment of the glass cover plate of the present invention.
Figure 8:
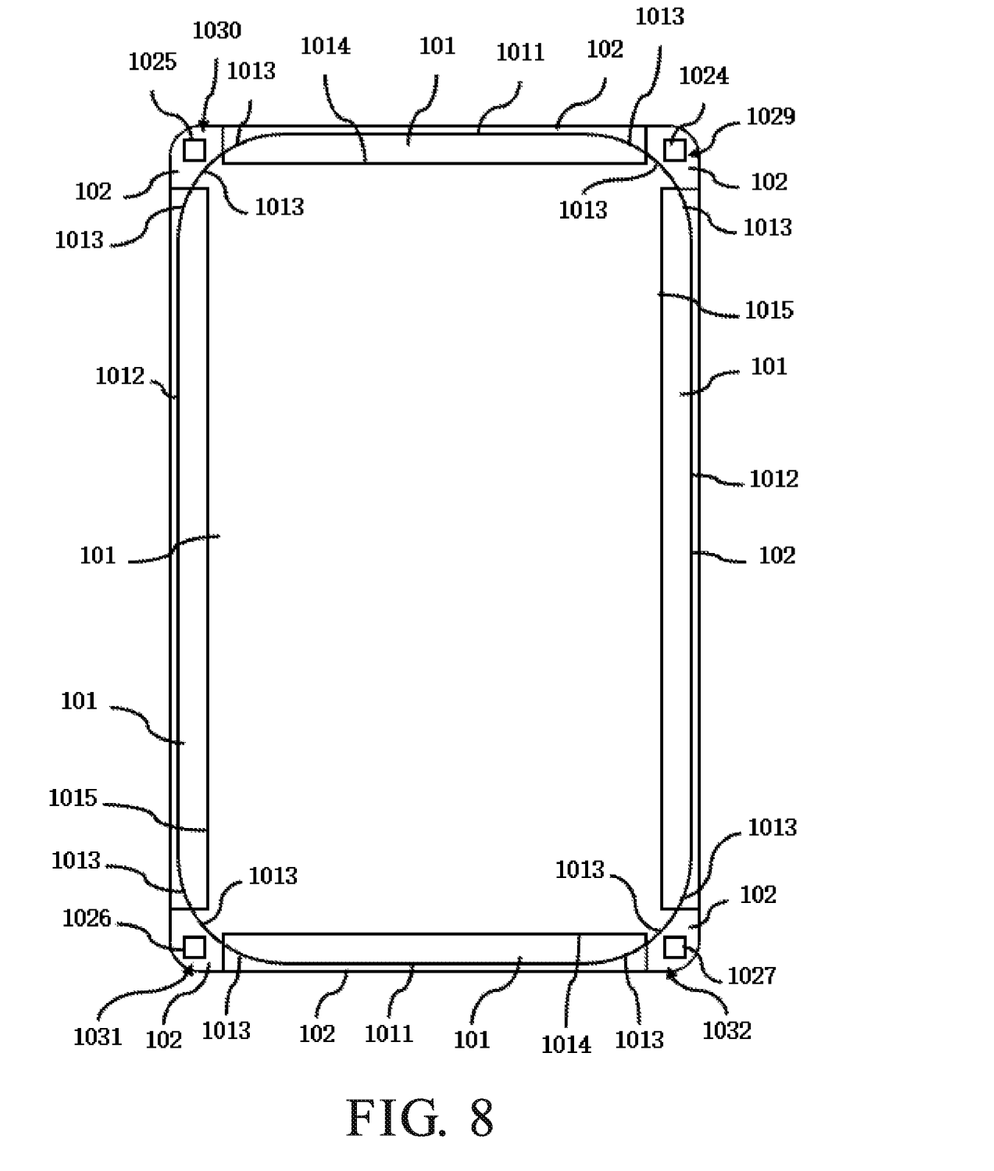
FIG. 8 is a top view of the fifth embodiment of the glass cover plate of the present invention.
Figure 9:
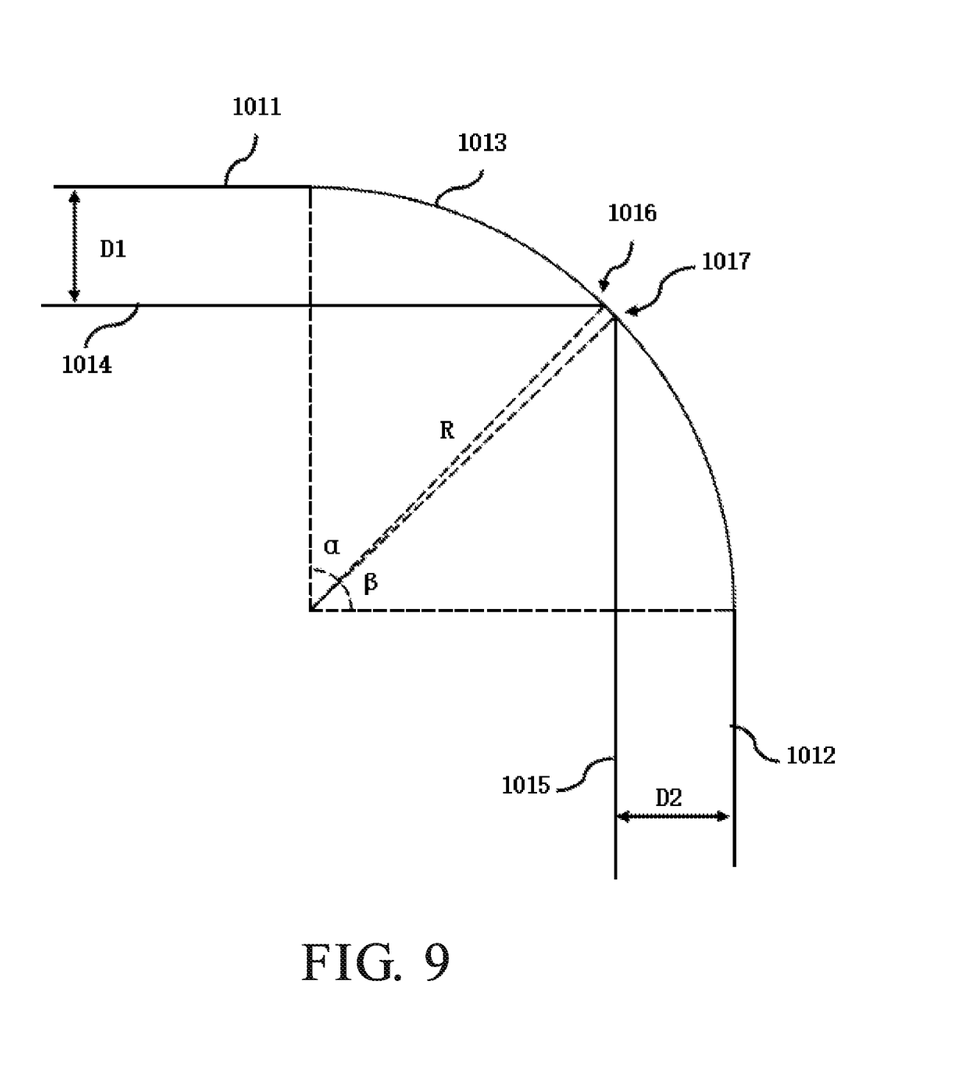
FIG. 9 is a schematic view of a position relation of a first straight edge portion and a first bending line and a position relation of a second straight edge portion and a second bending line of the fifth embodiment of the glass cover plate of the present invention.

With reference to FIG. 7 to FIG. 9, FIG. 7 is a perspective view of a fifth embodiment of the glass cover plate 201 of the present invention. FIG. 8 is a top view of the fifth embodiment of the glass cover plate 201 of the present invention. FIG. 9 is a schematic view of a position relation of a first straight edge portion 1011 and a first bending line 1014 and a position relation of a second straight edge portion 1012 and a second bending line 1015 of the fifth embodiment of the glass cover plate 201 of the present invention.

The fifth embodiment and any of the above first to fourth embodiments similar, a difference therebetween is as follows:

To further increase the screen-to-body ratio of the terminal, as an improvement solution, the edge portion of the glass cover plate 201 is disposed in a bent status or curved status.

In other words, the four edge portions of the glass cover plate 201 along a first direction and a second direction perpendicular to the first direction are disposed in a bent status or curved status.

A portion of the displaying region 101 corresponding to each first straight edge portion 1011, according to a first bending line 1014 serving as an axis line, bends or curves perpendicularly relative to a plane corresponding to the glass cover plate 201. A portion of the displaying region 101 corresponding to each second straight edge portion 1012, according to a second bending line 1015 serving as an axis line, bends or curves perpendicularly relative to the plane corresponding to the glass cover plate 201. An intersecting point of an extension line of the first bending line 1014 and an extension line of the second bending line 1015 is located outside the displaying region 101.

The first bending line 1014 and a first curve corresponding to the first curved edge portion 1013 has a first intersecting point 1016. The first bending line 1014 parallels a first straight line corresponding to the first straight edge portion 1011. The first bending line 1014 and the first straight line has a first distance D1. The first distance $D1 = a$ length $R*(1-\cos \alpha)$ of the curvature radius of the first curve on the place of the first intersecting point 1016, wherein the $\alpha$ is an included angle of the curvature radius of the first curve on the place of the first intersecting point 1016 and the second straight line. The $\alpha$ is greater than 0 and is less than $\pi/2$. For example, the $\alpha=5$ degrees, 10 degrees, 15 degrees, 20 degrees, 25 degrees, 30 degrees, 35 degrees, 40 degrees, 45 degrees, 50 degrees, 55 degrees, 60 degrees, 65 degrees, 70 degrees, 75 degrees, 80 degrees, or 85 degrees.

A portion of the glass cover plate 201 from the first bending line 1014 to the third straight line is curved.

The second bending line 1015 and the second curve has a second intersecting point 1017. The second bending line 1015 parallels a second straight line corresponding to the second straight edge portion 1012. The second bending line 1015 and the second straight line has a second distance D2. The second distance $D2 = a$ length $R*(1-\cos \beta)$ of the curvature radius of the first curve on the place of the second intersecting point 1017, wherein the $\beta$ is an included angle of the curvature radius of the first curve on the place of the second intersecting point 1017 and the first straight line. The $\beta$ is greater than 0 and is less than $\pi/2$. For example, the $\beta=5$ degrees, 10 degrees, 15 degrees, 20 degrees, 25 degrees, 30 degrees, 35 degrees, 40 degrees, 45 degrees, 50 degrees, 55 degrees, 60 degrees, 65 degrees, 70 degrees, 75 degrees, 80 degrees, or 85 degrees.

A sum of the $\alpha$ and the $\beta$ is less than or equal to $\pi/2$.

A portion of the glass cover plate 201 from the second bending line 1015 to the fourth straight line is curved.

Four corner portions of the glass cover plate 201 keep in a plane status. The corner portion keeping in the plane status is formed by disposing the intersecting point of the first bending line 1014 and the second bending line 1015 out of the displaying region 101. In other words, the first bending line 1014 and the second bending line 1015 are intersected outside the displaying region 101.

By disposing the four edge portions of the glass cover plate 201 in the bent status or curved status, frame widths of the four edge portions of the glass cover plate 201 can be effectively reduced such that the display assembly has a higher screen-to-body ratio.

At the same time, because the first straight edge portion 1011 and the first bending line 1014 have the above predetermined position relation, and the second straight edge portion 1012 and the second bending line 1015 have the above predetermined position relation, the issue that the four corner portions of the display panel 202 protrudes (an interfering issue occurs) due to bending or curving of the two edge portions (the first straight edge portion 1011 and the second straight edge portion 1012) adjacent to each corner portion is efficiently avoided.

Although the preferred embodiments of the present invention have been disclosed as above, the aforementioned preferred embodiments are not used to limit the present invention. The person of ordinary skill in the art may make various of changes and modifications without departing from the spirit and scope of the present invention. Therefore, the scope of protection of the present invention is defined by the scope of the claims.

What is claimed is:

1. A glass cover plate for use in a display assembly, wherein the glass cover plate comprises:
   a displaying region, the displaying region corresponding a displaying area of a display panel of the display assembly; and
   a periphery region, the periphery region surrounding the displaying region, the periphery region comprising a first corner portion, a second corner portion, a third corner portion, and a fourth corner portion;
   wherein the first corner portion comprises a first information medium window, the first information medium window corresponds to first electrical element;

wherein the second corner portion comprises a second information medium window, the second information medium window corresponds to a second electrical element;

wherein the second corner portion and the first corner portion are located on a same side of the periphery region;

wherein the third corner portion and the first corner portion are oppositely disposed;

wherein the fourth corner portion and the third corner portion are located on a same side of the periphery region, and the fourth corner portion and the second corner portion are oppositely disposed;

wherein an orthographic projection of an edge portion of the displaying region on a plane paralleling the glass cover plate comprises two opposite first straight edge portions, two opposite second straight edge portions, and four first curved edge portions; wherein two ends of each of the first curved edge portions are connected to a corresponding first straight edge portion and a corresponding second straight edge portion corresponding to the first straight edge portion, respectively; and the four first curved edge portions correspond to the first corner portion, the second corner portion, the third corner portion and the fourth corner portion; and wherein the four first curved edge portions are all located within a closed pattern enclosed by extension lines of the two first straight edge portions and the two second straight edge portions.

2. The glass cover plate for use in the display assembly as claimed in claim 1, wherein the third corner portion comprises a third information medium window, the third information medium window corresponds to a third electrical element.

3. The glass cover plate for use in the display assembly as claimed in claim 1, wherein the fourth corner portion comprises a fourth information medium window, the fourth information medium window corresponds to a fourth electrical element.

4. The glass cover plate for use in the display assembly as claimed in claim 3, wherein a masking layer is disposed on the periphery region, a first through hole is disposed in the masking layer and located over the first information medium window, a second through hole is disposed in the masking layer and located over the second information medium window, a third through hole is disposed in the masking layer and located over the third information medium window, and a fourth through hole is disposed in the masking layer and located over the fourth information medium window.

5. The glass cover plate for use in the display assembly as claimed in claim 1, wherein the periphery region further comprises a fifth information medium window, the fifth information medium window is located between the first corner portion and the second corner portion, the fifth information medium window penetrates the glass cover plate along a direction that is perpendicular to a plane paralleling the glass cover plate, and the fifth information medium window corresponds to a fifth electrical element.

6. The glass cover plate for use in the display assembly as claimed in claim 5, wherein the first information medium window, the second information medium window, the third information medium window, the fourth information medium window and the fifth information medium window are configured respectively for information mediums each of which is transmitted between a space outside a second surface of the glass cover plate and one of the first electrical element, the second electrical element, the third electrical element, the fourth electrical element and the fifth electrical element.

7. The glass cover plate for use in the display assembly as claimed in claim 1, wherein an orthographic projection of an outline of the periphery region on a plane paralleling the glass cover plate is rectangular, an orthographic projection of an outline of the displaying region on the plane paralleling the glass cover plate is rectangular, circular or elliptical, and the first corner portion, the second corner portion, the third corner portion and the fourth corner portion correspond to four corners of the periphery region.

8. The glass cover plate for use in the display assembly as claimed in claim 1, wherein a portion of the displaying region corresponding to each first straight edge portion, according to a first bending line serving as an axis line, bends or curves perpendicularly relative to a plane corresponding to the glass cover plate; and a portion of the displaying region corresponding to each second straight edge portion, according to a second bending line serving as an axis line, bends or curves perpendicularly relative to the plane corresponding to the glass cover plate;

wherein an intersecting point of an extension line of the first bending line and an extension line of the second bending line is located outside the displaying region.

9. The glass cover plate for use in the display assembly as claimed in claim 1, wherein a curvature radius of one of the four first curved edge portions is greater or less than a curvature radius of another; or a curvature radius of one of the four first curved edge portions is equal to a curvature radius of another.

10. The glass cover plate for use in the display assembly as claimed in claim 1, wherein an orthographic projection of an edge portion of the periphery region on the plane paralleling the glass cover plate comprises two opposite third straight edge portions, two opposite fourth straight edge portions and four second curved edge portions, wherein each of the second curved edge portions is connected to a corresponding third straight edge portion and a corresponding fourth straight edge portion, and the four second curved edge portions correspond to the first corner portion, the second corner portion, the third corner portion and the fourth corner portion;

wherein the four second curved edge portions are all located within a closed pattern enclosed by extension lines of the two third straight edge portions and the two fourth straight edge portions, and a curvature radius of first curve corresponding to the first curved edge portion is greater than a curvature radius of a second curve corresponding to the second curved edge portion.

11. The glass cover plate for use in the display assembly as claimed in claim 1, wherein an orthographic projection of an edge portion of the periphery region on a plane paralleling the glass cover plate comprises two opposite third straight edge portions, two opposite fourth straight edge portions and four second curved edge portions, wherein third straight lines corresponding to the third straight edge portions are perpendicular to fourth straight lines corresponding to the fourth straight edge portions, each of the second curved edge portions is connected to a corresponding third straight edge portion and a corresponding fourth straight edge portion, the four second curved edge portions correspond to the first corner portion, the second corner portion, the third corner portion and the fourth corner portion;

wherein the four second curved edge portions are all located out of a closed pattern enclosed by extension lines of the two third straight edge portions and the two fourth straight edge portions.

12. A display assembly comprising the glass cover plate as claimed in claim 1, wherein the display assembly further comprises a display panel, the display panel is installed on the glass cover plate.

13. A terminal comprising the glass cover plate as claimed in claim 1, wherein the terminal further comprises a display panel and a terminal main body, the display panel and the glass cover plate are installed on the terminal main body.

* * * * *